(12) United States Patent
Wang et al.

(10) Patent No.: US 11,016,346 B2
(45) Date of Patent: May 25, 2021

(54) DISPLAY SUBSTRATE, DISPLAY APPARATUS, AND METHOD OF FABRICATING DISPLAY SUBSTRATE

(71) Applicants: BOE TECHNOLOGY GROUP CO., LTD., Beijing (CN); Ordos Yuansheng Optoelectronics Co., Ltd., Inner Mongolia (CN)

(72) Inventors: Huilian Wang, Beijing (CN); Yan Wang, Beijing (CN); Xiaofeng Zhang, Beijing (CN); Wei Wei, Beijing (CN); Jie Tong, Beijing (CN); Xuelu Wang, Beijing (CN)

(73) Assignees: BOE TECHNOLOGY GROUP CO., LTD., Beijing (CN); Ordos Yuansheng Optoelectronics Co., Ltd., Inner Mongolia (CN)

( * ) Notice: Subject to any disclaimer, the term of this patent is extended or adjusted under 35 U.S.C. 154(b) by 379 days.

(21) Appl. No.: 15/776,964

(22) PCT Filed: Aug. 31, 2017

(86) PCT No.: PCT/CN2017/099877
§ 371 (c)(1),
(2) Date: May 17, 2018

(87) PCT Pub. No.: WO2018/205461
PCT Pub. Date: Nov. 15, 2018

(65) Prior Publication Data
US 2020/0355955 A1    Nov. 12, 2020

(30) Foreign Application Priority Data

May 12, 2017 (CN) .......................... 201710336052.X

(51) Int. Cl.
*G02F 1/1339* (2006.01)

(52) U.S. Cl.
CPC ................................ *G02F 1/13394* (2013.01)

(58) Field of Classification Search
CPC ..................................................... G02F 1/13394
See application file for complete search history.

(56) References Cited

U.S. PATENT DOCUMENTS

| 2004/0021808 A1* | 2/2004 | Johgan | G02F 1/13394 349/106 |
| 2007/0200994 A1* | 8/2007 | Yanagisawa | G02F 1/13394 349/155 |

(Continued)

FOREIGN PATENT DOCUMENTS

| CN | 101310215 A | 11/2008 |
| CN | 103268037 A | 8/2013 |

(Continued)

OTHER PUBLICATIONS

International Search Report & Written Opinion dated Feb. 22, 2018, regarding PCT/CN2017/099877.

*Primary Examiner* — James A Dudek
(74) *Attorney, Agent, or Firm* — Intellectual Valley Law, P.C.

(57) ABSTRACT

The present application discloses a display substrate having an array of a plurality of pixel areas. The display substrate includes a base substrate and a plurality of main spacers on the base substrate. The array of the plurality of pixel areas includes at least one group of pixel areas. Each of the at least one group of pixel areas includes a matrix of pixel areas. In each of the at least one group of pixel areas, each row of the plurality of pixel areas corresponds to at least one of the plurality of main spacers, and each column of the plurality of pixel areas corresponds to at least one of the plurality of main spacers.

15 Claims, 5 Drawing Sheets

(56) References Cited

U.S. PATENT DOCUMENTS

| | | | |
|---|---|---|---|
| 2015/0241726 A1* | 8/2015 | Nakamura | G02F 1/13394 349/138 |
| 2015/0261050 A1* | 9/2015 | Chen | G02F 1/133514 349/42 |
| 2015/0309221 A1 | 10/2015 | Li et al. | |

FOREIGN PATENT DOCUMENTS

| | | |
|---|---|---|
| CN | 104020605 A | 9/2014 |
| CN | 105807484 A | 7/2016 |
| CN | 105807508 A | 7/2016 |
| JP | 3946498 B2 | 7/2007 |

* cited by examiner

DISPLAY SUBSTRATE, DISPLAY APPARATUS, AND METHOD OF FABRICATING DISPLAY SUBSTRATE

CROSS-REFERENCE TO RELATED APPLICATION

This application is a national stage application under 35 U.S.C. § 371 of International Application No. PCT/CN2017/099877, filed Aug. 31, 2017, which claims priority to Chinese Patent Application No. 201710336052.X, filed May 12, 2017, the contents of which are incorporated by reference in the entirety.

TECHNICAL FIELD

The present invention relates to display technology, more particularly, to a display substrate, a display apparatus having the same, and a fabricating method thereof.

BACKGROUND

In a liquid crystal display panel, two types of spacers are provided between the array substrate and the color filter substrate to maintain a cell gap. The first type of spacers are main spacers. The height of the main spacers establishes the cell gap between the array substrate and the color filter substrate. The contacting area of the main spacers (with the substrates) and their height determine the amount of stress they can dissipate. The second type of spacers are auxiliary spacers. Auxiliary spacers may be designed so that they dissipate less amount of stress as compared to the main spacers. For example, auxiliary spacers may not extend all the way between the array substrate and the color filter substrate.

SUMMARY

In one aspect, the present invention provides a display substrate having an array of a plurality of pixel areas, comprising a base substrate; and a plurality of main spacers on the base substrate; wherein the array of the plurality of pixel areas comprises at least one group of pixel areas, each of the at least one group of pixel areas comprises a matrix of pixel areas; wherein, in each of the at least one group of pixel areas, each row of the plurality of pixel areas corresponds to at least one of the plurality of main spacers, and each column of the plurality of pixel areas corresponds to at least one of the plurality of main spacers.

Optionally, in each of the at least one group of pixel areas, each row of the plurality of pixel areas corresponds to a single one of the plurality of main spacers; and two of the plurality of main spacers corresponding to different rows of the plurality of pixel areas correspond to different columns of the plurality of pixel areas.

Optionally, in each of the at least one group of pixel areas, each of the plurality of main spacers corresponding to an odd-numbered row of the plurality of pixel areas corresponds to an even-numbered column of the plurality of pixel areas; and each of the plurality of main spacers corresponding to an even-numbered row of the plurality of pixel areas corresponds to an odd-numbered column of the plurality of pixel areas.

Optionally, in each of the at least one group of pixel areas, each row of the plurality of pixel areas corresponds to a single one of the plurality of main spacers; and each column of the plurality of pixel areas corresponds to a single one of the plurality of main spacers.

Optionally, in each of the at least one group of pixel areas, each of the plurality of pixel areas comprises a plurality of subpixel areas; and a ratio of a total number of the plurality of main spacers to a total number of the plurality of subpixel areas is in a range of 1:144 to 1:3.

Optionally, the ratio of the total number of the plurality of main spacers to the total number of the plurality of subpixel areas is in a range of 1:80 to 1:60.

Optionally, in each of the at least one group of pixel areas, each of the plurality of pixel areas comprises a plurality of subpixel areas; an orthographic projection of the one of the plurality of main spacers corresponding to each row of plurality of pixel areas on the base substrate partially overlaps with an orthographic projection of each of multiple adjacent subpixel areas of the plurality of subpixel areas on the base substrate; and aperture ratios of the multiple adjacent subpixel areas of the plurality of subpixel areas differ from each other by equal to or less than 1%.

Optionally, the orthographic projection of the one of the plurality of main spacers corresponding to each row of plurality of pixel areas on the base substrate partially overlaps with an orthographic projection of each of four adjacent subpixel areas of the plurality of subpixel areas on the base substrate; the four adjacent subpixel areas of the plurality of subpixel areas comprise two adjacent subpixel areas in the present row, and two adjacent subpixel areas in an adjacent row; and the two adjacent subpixel areas in the adjacent row are respectively adjacent to the two adjacent subpixel areas in the present row.

Optionally, in each of the at least one group of pixel areas, a total number N of main spacers in five consecutive rows of pixel areas is less than ten.

Optionally, in each of the at least one group of pixel areas, a total number N1 of main spacers corresponding to odd-numbered columns of pixel areas in five consecutive rows of pixel areas is a positive integer less than five; and a total number N2 of main spacers corresponding to even-numbered columns of pixel areas in five consecutive rows of pixel areas is a positive integer less than five.

Optionally, a sum of N1 and N2 is five, each of N1 and N2 is equal to or greater than 2.

Optionally, the display substrate further comprises a plurality of auxiliary spacers; wherein each row of the plurality of pixel areas corresponds to multiple of plurality of auxiliary spacers; and each column of the plurality of pixel areas corresponds to multiple of plurality of auxiliary spacers.

Optionally, each of the plurality of pixel areas comprises a plurality of subpixel areas; and an orthographic projection of any one of the plurality of auxiliary spacers on the base substrate partially overlaps with an orthographic projection of each of multiple adjacent subpixel areas of the plurality of subpixel areas on the base substrate.

Optionally, one of the at least one group of pixel areas comprises a matrix of pixel areas having at least twenty pixel areas along the row direction and at least twenty pixel areas along the column direction.

Optionally, the at least one group of pixel areas comprises a plurality of repeating groups of pixel areas.

Optionally, the at least one group of pixel areas consists of a single group of pixel areas.

In another aspect, the present invention provides a display apparatus, comprising a display substrate described herein or fabricated by a method described herein and a second display substrate facing the display substrate; wherein the plurality of main spacers maintain a cell gap between the display substrate and the second display substrate.

In another aspect, the present invention provides a method of fabricating a display substrate having an array of a plurality of pixel areas, comprising forming a plurality of main spacers on a base substrate; wherein the array of the plurality of pixel areas is formed to comprise at least one group of pixel areas, each of the at least one group of pixel areas is formed to comprise a plurality of pixel areas arranged in a matrix; wherein, in each of the at least one group of pixel areas, the plurality of main spacers are formed so that each row of the plurality of pixel areas corresponds to at least one of the plurality of main spacers, and each column of the plurality of pixel areas corresponds to at least one of the plurality of main spacers.

Optionally, in each of the at least one group of pixel areas, the plurality of main spacers are formed so that each row of the plurality of pixel areas corresponds to a single one of the plurality of main spacers; and two of the plurality of main spacers corresponding to different rows of the plurality of pixel areas correspond to different columns of the plurality of pixel areas.

Optionally, each of the plurality of main spacers corresponding to an odd-numbered row of the plurality of pixel areas corresponds to an even-numbered column of the plurality of pixel areas; and each of the plurality of main spacers corresponding to an even-numbered row of the plurality of pixel areas corresponds to an odd-numbered column of the plurality of pixel areas.

Optionally, in each of the at least one group of pixel areas, each of the plurality of pixel areas comprises a plurality of subpixel areas; and the plurality of main spacers are formed so that a ratio of a total number of the plurality of main spacers to a total number of the plurality of subpixel areas is in a range of 1:144 to 1:3.

Optionally, each of the plurality of pixel areas comprises a plurality of subpixel areas; the plurality of main spacers are formed so that an orthographic projection of the one of the plurality of main spacers corresponding to each row of plurality of pixel areas on the base substrate partially overlaps with an orthographic projection of each of multiple adjacent subpixel areas of the plurality of subpixel areas on the base substrate; and aperture ratios of the multiple adjacent subpixel areas of the plurality of subpixel areas differ from each other by equal to or less than 1%.

Optionally, the plurality of main spacers are formed so that the orthographic projection of the one of the plurality of main spacers corresponding to each row of plurality of pixel areas on the base substrate partially overlaps with an orthographic projection of each of four adjacent subpixel areas of the plurality of subpixel areas on the base substrate; the four adjacent subpixel areas of the plurality of subpixel areas comprise two adjacent subpixel areas in the present row, and two adjacent subpixel areas in an adjacent row; and the two adjacent subpixel areas in the adjacent row are respectively adjacent to the two adjacent subpixel areas in the present row.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional display panels, a total number of main spacers in five consecutive rows of pixels, and corresponding to odd-numbered columns of pixels, is greater than five; and a total number of main spacers in five consecutive rows of pixels, and corresponding to even-numbered columns of pixels, is also greater than five. It was discovered in the present disclosure that this layout often leads to white mura when displaying a flicker pattern image. For example, the white mura may have a serrated shape or a stripe shape. The existence of the white mura reduces the sharpness of the image displayed in the flicker pattern, compromising display quality.

Accordingly, the present disclosure provides, inter alia, a display substrate, a display apparatus having the same, and a fabricating method thereof that substantially obviate one or more of the problems due to limitations and disadvantages of the related art. In one aspect, the present disclosure provides a display substrate having an array of a plurality of pixel areas. In some embodiments, the display substrate includes a base substrate and a plurality of main spacers on the base substrate. Optionally, each row of the plurality of pixel areas corresponds to at least one of the plurality of main spacers. Optionally, each column of the plurality of pixel areas corresponds to at least one of the plurality of main spacers.

In a display panel such as a liquid crystal display panel, a plurality of spacers are formed between two substrates of the display panel in order to maintain a substantially uniform cell gap between the two substrates. The plurality of spacers include a plurality of main spacers substantially supporting the two substrates and a plurality of auxiliary spacers assisting the role of the plurality of main spacers. Optionally, each of the plurality of main spacers have a first height, each of the plurality of auxiliary spacers have a second height, and the first height is greater than the second height. Optionally, each of the plurality of main spacers have a first support area, each of the plurality of auxiliary spacers have a second support area, and the first support area is greater than the second support area. Optionally, each of the plurality of main spacers have a first contact area, each of the plurality of auxiliary spacers have a second contact area, and the first contact area is greater than the second contact area.

Optionally, each of the plurality of main spacers is a spacer that dissipate more stress than each of the plurality of auxiliary spacers.

Figure 1:
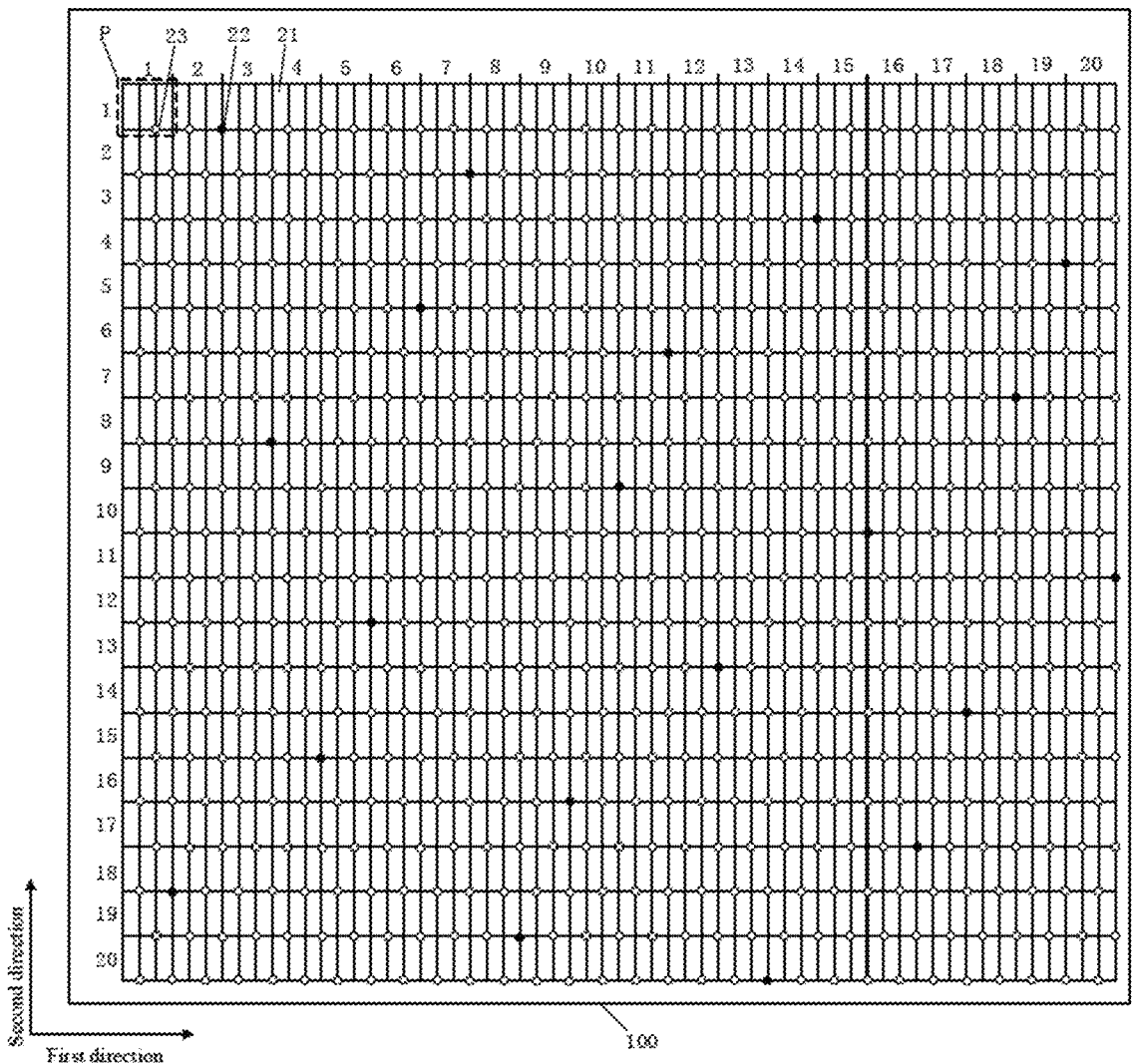
FIG. 1 is a schematic diagram illustrating the structure of a display substrate in some embodiments according to the present disclosure.

FIG. 1 is a schematic diagram illustrating the structure of a display substrate in some embodiments according to the present disclosure. Referring to FIG. 1, the display substrate in some embodiments includes an array of a plurality of pixel areas P in a matrix arranged in rows and columns. The display substrate includes a base substrate 100 and a plurality of main spacers 22 on the base substrate 100. In the present display substrate, each row of the plurality of pixel areas P along the first direction corresponds to at least one of the plurality of main spacers 22, and each column of the plurality of pixel areas P along the second direction corresponds to at least one of the plurality of main spacers 22. By having this design, white mura in a flicker pattern in a display panel having the present display substrate can be avoided, enhancing the sharpness of the image displayed in the flicker pattern and improving display quality.

Optionally, the display substrate is a counter substrate (e.g., a color filter substrate) facing an array substrate in a display panel. Optionally, the display substrate is a liquid crystal display substrate. Optionally, the plurality of pixel areas P are arranged in a matrix. Optionally, the plurality of pixel areas P are arranged in a form other than a matrix.

Referring to FIG. 1, in some embodiments, each row of the plurality of pixel areas P corresponds to a single one of the plurality of main spacers 22, e.g., the total area occupied by the plurality of main spacers 22 in each row of the plurality of pixel areas P is substantially equal to a single one of the plurality of main spacers 22. Optionally, a single one of the plurality of main spacers 22 is disposed on each row of the plurality of pixel areas P.

In some embodiments, two of the plurality of main spacers 22 corresponding to different rows of the plurality of pixel areas P correspond to different columns of the plurality of pixel areas P. In one example, a first one of the plurality of main spacers 22 corresponds to a first row of the plurality of pixel areas P and a first column of the plurality of pixel areas P, a second one of the plurality of main spacers 22 corresponds to a second row of the plurality of pixel areas P and a second column of the plurality of pixel areas P. The first row and the second row are different rows of the plurality of pixel areas P, and the first column and the second column are different columns of the plurality of pixel areas P.

Optionally, each of the plurality of main spacers 22 corresponding to an odd-numbered row of the plurality of pixel areas P corresponds to an even-numbered column of the plurality of pixel areas P. Optionally, each of the plurality of main spacers 22 corresponding to an even-numbered row of the plurality of pixel areas P corresponds to an odd-numbered column of the plurality of pixel areas P. Referring to FIG. 1, the one of the plurality of main spacers 22 corresponding to the first row of the plurality of pixel areas P corresponds to the second column of the plurality of pixel areas P, and the one of the plurality of main spacers 22 corresponding to the second row of the plurality of pixel areas P corresponds to the seventh column of the plurality of pixel areas P.

In some embodiments of the present display substrate, each of the plurality of main spacers 22 corresponding to an odd-numbered row of the plurality of pixel areas P corresponds to an even-numbered column of the plurality of pixel areas P, and each of the plurality of main spacers 22 corresponding to an even-numbered row of the plurality of pixel areas P corresponds to an odd-numbered column of the plurality of pixel areas P. By having this design, white mura in a flicker pattern in a display panel having the present display substrate can be avoided, enhancing the sharpness of the image displayed in the flicker pattern and improving display quality.

In some embodiments, each of the plurality of pixel areas P includes a plurality of subpixel areas 21. Optionally, the plurality of subpixel areas 21 are arranged in a matrix, as depicted in FIG. 1. Optionally, each of the plurality of pixel areas P includes three subpixel areas 21. In one example, each of the plurality of pixel areas P includes a red subpixel area, a green subpixel area, and a blue subpixel area. Optionally, each of the plurality of pixel areas P (along the row direction) includes three columns of subpixel areas 21, e.g., each of the plurality of pixel areas P includes three subpixel areas 21 sequentially arranged along the row direction.

Optionally, the display substrate has a RGB pixel arrangement. Optionally, the display substrate has a RGBW pixel arrangement. Optionally, the display substrate has a Pentile pixel arrangement. Optionally, the display substrate is a liquid crystal display substrate. Optionally, the display substrate is an organic light emitting diode display substrate.

In some embodiments, each row of the plurality of subpixel areas 21 along the first direction corresponds to at least one of the plurality of main spacers 22, each column of the plurality of pixel areas P along the second direction corresponds to at least one of the plurality of main spacers 22 disposed on a single column of the plurality of subpixel areas 21 in the each column of the plurality of pixel areas P.

In some embodiments, each row of the plurality of subpixel areas 21 corresponds to a single one of the plurality of main spacers 22, e.g., the total area occupied by the plurality of main spacers 22 in each row of the plurality of subpixel areas 21 is substantially equal to a single one of the plurality of main spacers 22. Optionally, a single one of the plurality of main spacers 22 is disposed on each row of the plurality of subpixel areas 21.

In some embodiments, two of the plurality of main spacers 22 corresponding to different rows of the plurality of pixel areas P correspond to different columns of the plurality of pixel areas P. In one example, a first one of the plurality of main spacers 22 corresponds to a first row of the plurality of subpixel areas 21 and one column of the plurality of subpixel areas 21 in a first column of the plurality of pixel areas P; a second one of the plurality of main spacers 22 corresponds to a second row of the plurality of pixel areas P and one column of the plurality of subpixel areas 21 in a second column of the plurality of pixel areas P. The first row and the second row are different rows of the plurality of pixel areas P, and the first column and the second column are different columns of the plurality of pixel areas P.

Optionally, each of the plurality of main spacers 22 corresponding to an odd-numbered row of the plurality of pixel areas P corresponds to one column of the plurality of subpixel areas 21 in an even-numbered column of the plurality of pixel areas P. Optionally, each of the plurality of main spacers 22 corresponding to an even-numbered row of the plurality of pixel areas P corresponds to one column of the plurality of subpixel areas 21 in an odd-numbered column of the plurality of pixel areas P. Referring to FIG. 1, the one of the plurality of main spacers 22 corresponding to the first row of the plurality of pixel areas P corresponds to the third column of subpixel areas 21 in the second column of the plurality of pixel areas P. and the one of the plurality of main spacers 22 corresponding to the second row of the plurality of pixel areas P corresponds to the third column of subpixel areas 21 in the seventh column of the plurality of pixel areas P.

In some embodiments, and referring to FIG. 1, each row of the plurality of pixel areas P when viewed along the first direction (the row direction) corresponds to at least one, and only one, of the plurality of main spacers 22, which corresponds to a third column of subpixel areas 21 in one of the plurality of pixel areas P along the row.

In some embodiments, and referring to FIG. 1, each column of the plurality of pixel areas P when viewed along the second direction (the column direction) corresponds to at least one, and only one, of the plurality of main spacers 22, which corresponds to a third column of subpixel areas 21 in one of the plurality of pixel areas P along the column.

In some embodiments, a distribution density of the plurality of main spacers 22 in the display substrate is in a range of 1:144 to 1:3. As used herein, the term "distribution density of the plurality of main spacers" refers to a ratio of a total number of the plurality of main spacers 22 to a total number of the plurality of subpixel areas 21. Optionally, the distribution density of the plurality of main spacers 22 in the display substrate is in a range of 1:120 to 1:20, e.g., 1:100 to 1:40, 1:80 to 1:60. Referring to FIG. 1, the total number of the plurality of main spacers 22 is twenty, the total number of the plurality of subpixel areas 21 is one thousand and two hundred, and the distribution density of the plurality of main spacers 22 in the display substrate is 1:60. Optionally, the distribution density of the plurality of main spacers 22 in the display substrate is 1:80.

In some embodiments, an orthographic projection of the one of the plurality of main spacers 22 corresponding to each row of plurality of pixel areas P on the base substrate 100 partially overlaps with an orthographic projection of each of multiple adjacent subpixel areas 21 of the plurality of subpixel areas 21 on the base substrate 100. Aperture ratios of the multiple adjacent subpixel areas 21 of the plurality of subpixel areas 21 differ from each other by equal to or less than 1%. This design ensures that the display substrate has a substantially uniform aperture ratio of subpixel areas 21.

Figure 2:
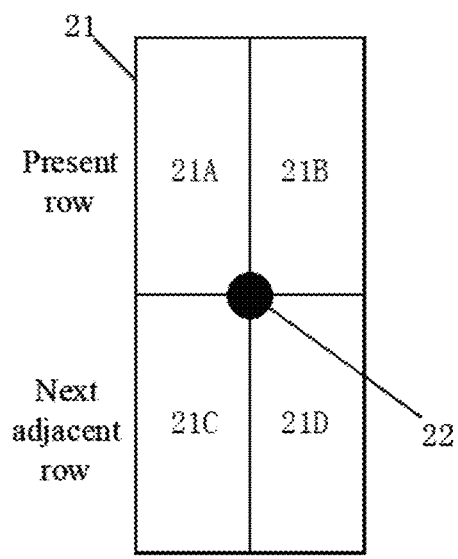
FIG. 2 is a schematic diagram illustrating the layout of one of the plurality of main spacers in a display substrate in some embodiments according to the present disclosure.

FIG. 2 is a schematic diagram illustrating the layout of one of the plurality of main spacers in a display substrate in some embodiments according to the present disclosure. Referring to FIG. 1 and FIG. 2, the orthographic projection of the one of the plurality of main spacers 22 corresponding to each row of plurality of pixel areas P on the base substrate 100 partially overlaps with an orthographic projection of each of four adjacent subpixel areas 21 of the plurality of subpixel areas 21 on the base substrate 100. The four adjacent subpixel areas 21 of the plurality of subpixel areas 21 include two adjacent subpixel areas 21 in the present row, and two adjacent subpixel areas 21 in an adjacent row (e.g., a previous adjacent row or a next adjacent row) that are adjacent to the two adjacent subpixel areas 21 in the present row. In one example, a first quarter portion of the orthographic projection of the one of the plurality of main spacers 22 corresponding to the first row (the present row) of plurality of pixel areas P on the base substrate 100 overlaps with a portion of the projection of subpixel area 21A in the first row; a second quarter portion of the orthographic projection of the one of the plurality of main spacers 22 corresponding to the first row (the present row) of plurality of pixel areas P on the base substrate 100 overlaps with a portion of the projection of subpixel area 21B in the first row, the subpixel area 21B adjacent to the subpixel area 21A; a third quarter portion of the orthographic projection of the one of the plurality of main spacers 22 corresponding to the first row (the present row) of plurality of pixel areas P on the base substrate 100 overlaps with a portion of the projection of subpixel area 21C in the second row (the next adjacent row), the subpixel area 21C adjacent to the subpixel area 21A; and a fourth quarter portion of the orthographic projection of the one of the plurality of main spacers 22 corresponding to the first row (the present row) of plurality of pixel areas P on the base substrate 100 overlaps with a portion of the projection of subpixel area 21D in the second row (the next adjacent row), the subpixel area 21D adjacent to the subpixel area 21C and the subpixel area 21B.

Accordingly, in the context of the present disclosure, the term "corresponding to" is not limited to embodiments in which one object in disposed entirely on another object. In one example, a reference row of the plurality of pixel areas corresponding to a single one of the plurality of main spacers refers to an embodiment in which the single one of the plurality of main spacers is disposed entirely within a single pixel area of the reference row of the plurality of pixel areas. In another example, the reference row of the plurality of pixel areas corresponding to a single one of the plurality of main spacers refers to an embodiment in which the single one of the plurality of main spacers is disposed within multiple pixel areas. In that case, multiple pixel areas. Optionally, multiple pixel areas within which the single one of the plurality of main spacers is disposed could be multiple pixel areas in the reference row of the plurality of pixel areas. Optionally, multiple pixel areas within which the single one of the plurality of main spacers is disposed could be one or more pixel areas in the reference row of the plurality of pixel areas and one or more pixel areas in a row of the plurality of pixel areas adjacent to the reference row of the plurality of pixel areas (as shown in FIG. 2 and described above). Thus, in the context of the present disclosure, when a single one of the plurality of main spacers is disposed within multiple pixel areas, the term "corresponding to a single one of the plurality of main spacers" means that only one of the multiple pixel areas having a designated spatial relationship with the single one of the plurality of main spacers corresponds to the single one of the plurality of main spacers. For example, in FIG. 2, only the subpixel area on the upper left side of the single one of the plurality of main spacers 22, e.g., the subpixel area 21A corresponds to the single one of the plurality of main spacers 22. Accordingly, the term the "row of the plurality of pixel areas corresponds to a single one of the plurality of main spacers" means that the row of the plurality of pixel areas containing a subpixel area having a designated spatial relationship with the single one of the plurality of main spacers (e.g., the "present row" in FIG. 2) corresponds to the single one of the plurality of main spacers. The designated spatial relationship is applied to the entire display substrate in determining the correspondence relationship between a row of the plurality of pixel areas and a main spacer. For example, in the context of the present disclosure, the term "each row of the plurality of pixel areas corresponds to at least one of the plurality of main spacers" means that each row of the plurality of pixel areas contains at least one subpixel areas having the designated spatial relationship with respective main spacers disposed at least partially on the at least one subpixel areas. In a specific example, in determining correspondence relationship, a subpixel area which is on the upper left side of the respective main spacer, or a row containing the same, is said to correspond to the respective main spacer.

Figure 3:
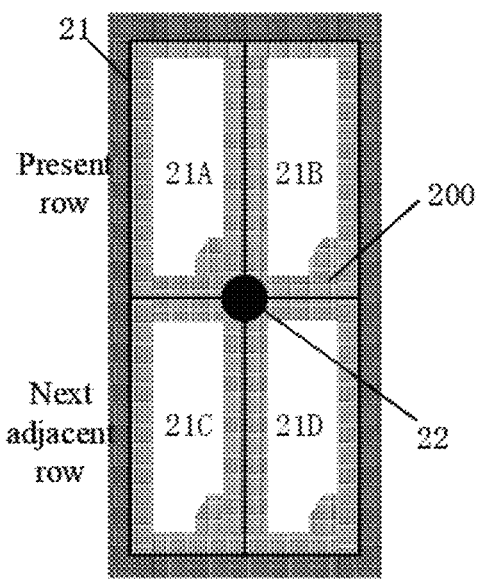
FIG. 3 is a schematic diagram illustrating the layout of one of the plurality of main spacers in a display substrate in some embodiments according to the present disclosure.

In some embodiments, the display substrate further includes a black matrix on the base substrate. FIG. 3 is a schematic diagram illustrating the layout of one of the plurality of main spacers in a display substrate in some embodiments according to the present disclosure. Referring to FIG. 3, the display substrate includes a black matrix 200 in the inter-subpixel region of the display substrate and defining a plurality of subpixel regions (light transmissive regions) of the display substrate. Optionally, an orthographic projection of the one of the plurality of main spacers 22 corresponding to each row of plurality of pixel areas P on the base substrate 100 at least partially overlaps with an orthographic projection of the black matrix 200 on the base substrate 100. Optionally, the orthographic projection of the black matrix 200 on the base substrate 100 covers the orthographic projection of the one of the plurality of main spacers 22 corresponding to each row of plurality of pixel areas P on the base substrate 100. The plurality of main spacers 22 are on a side of the black matrix 200 distal to the base substrate 100.

In some embodiments, the black matrix includes a plurality rows of black matrices and a plurality columns of black matrices crossing over each other, forming a plurality of intersections. Optionally, each of the plurality of main spacers 22 is disposed on one of the plurality of intersections, as depicted in FIG. 3.

Referring to FIG. 1, the display substrate in some embodiments further includes a plurality of auxiliary spacers 23. Optionally, each row of the plurality of pixel areas P corresponds to multiple of plurality of auxiliary spacers 23. Optionally, each column of the plurality of pixel areas P corresponds to multiple of plurality of auxiliary spacers 23. Optionally, the plurality of spacers (main spacer(s) or auxiliary spacers) are substantially equally spaced apart, e.g., in each row or in each column. In one example, in each row or in each column, a distance between each pair of adjacent main spacer and auxiliary spacer is substantially the same as a distance between each pair of adjacent auxiliary spacers.

Figure 4:
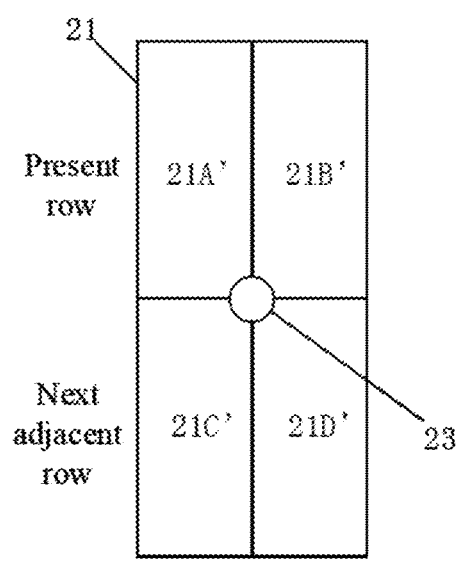
FIG. 4 is a schematic diagram illustrating the layout of one of the plurality of auxiliary spacers in a display substrate in some embodiments according to the present disclosure.

FIG. 4 is a schematic diagram illustrating the layout of one of the plurality of auxiliary spacers in a display substrate in some embodiments according to the present disclosure. Referring to FIG. 4, an orthographic projection of any one of the plurality of auxiliary spacers 23 on the base substrate 100 partially overlaps with an orthographic projection of each of four adjacent subpixel areas 21 of the plurality of subpixel areas 21 on the base substrate 100. The four adjacent subpixel areas 21 of the plurality of subpixel areas 21 include two adjacent subpixel areas 21 in the present row, and two adjacent subpixel areas 21 in an adjacent row (e.g., a previous adjacent row or a next adjacent row) that are adjacent to the two adjacent subpixel areas 21 in the present row. In one example, a first quarter portion of the orthographic projection of the one of the plurality of auxiliary spacers 23 corresponding to the first row (the present row) on the base substrate 100 overlaps with a portion of the projection of subpixel area 21A' in the first row; a second quarter portion of the orthographic projection of the one of the plurality of auxiliary spacers 23 corresponding to the first row (the present row) on the base substrate 100 overlaps with a portion of the projection of subpixel area 21B' in the first row, the subpixel area 21B' adjacent to the subpixel area 21A'; a third quarter portion of the orthographic projection of the one of the plurality of auxiliary spacers 23 corresponding to the first row (the present row) on the base substrate 100 overlaps with a portion of the projection of subpixel area 21C' in the second row (the next adjacent row), the subpixel area 21C' adjacent to the subpixel area 21A'; and a fourth quarter portion of the orthographic projection of the one of the plurality of auxiliary spacers 23 corresponding to the first row (the present row) on the base substrate 100 overlaps with a portion of the projection of subpixel area 21D' in the second row (the next adjacent row), the subpixel area 21D' adjacent to the subpixel area 21C' and the subpixel area 21B'.

In some embodiments, and referring to FIG. 1, any row of the plurality of pixel areas P corresponds to at least one, and only one, of the plurality of main spacers 22, and the remainder of the plurality of spacers corresponding to the row of the plurality of pixel areas P are multiple of the plurality of auxiliary spacers 23. Optionally, the plurality of auxiliary spacers 23 are evenly distributed over the display substrate.

In some embodiments, the display substrate includes a plurality of repeating groups of pixel areas P. Optionally, each of the plurality of repeating groups of pixel areas P includes a plurality of pixel areas P arranged in a matrix, e.g., a matrix having at least five pixel areas along the row direction and at least five pixel areas along the column direction (5×5 matrix). Optionally, the matrix has at least ten pixel areas along the row direction and at least ten pixel areas along the column direction (10×10 matrix). Optionally, the matrix has at least fifteen pixel areas along the row direction and at least fifteen pixel areas along the column direction (15×15 matrix). Optionally, the matrix has at least twenty pixel areas along the row direction and at least twenty pixel areas along the column direction (20×20 matrix).

Figure 5:
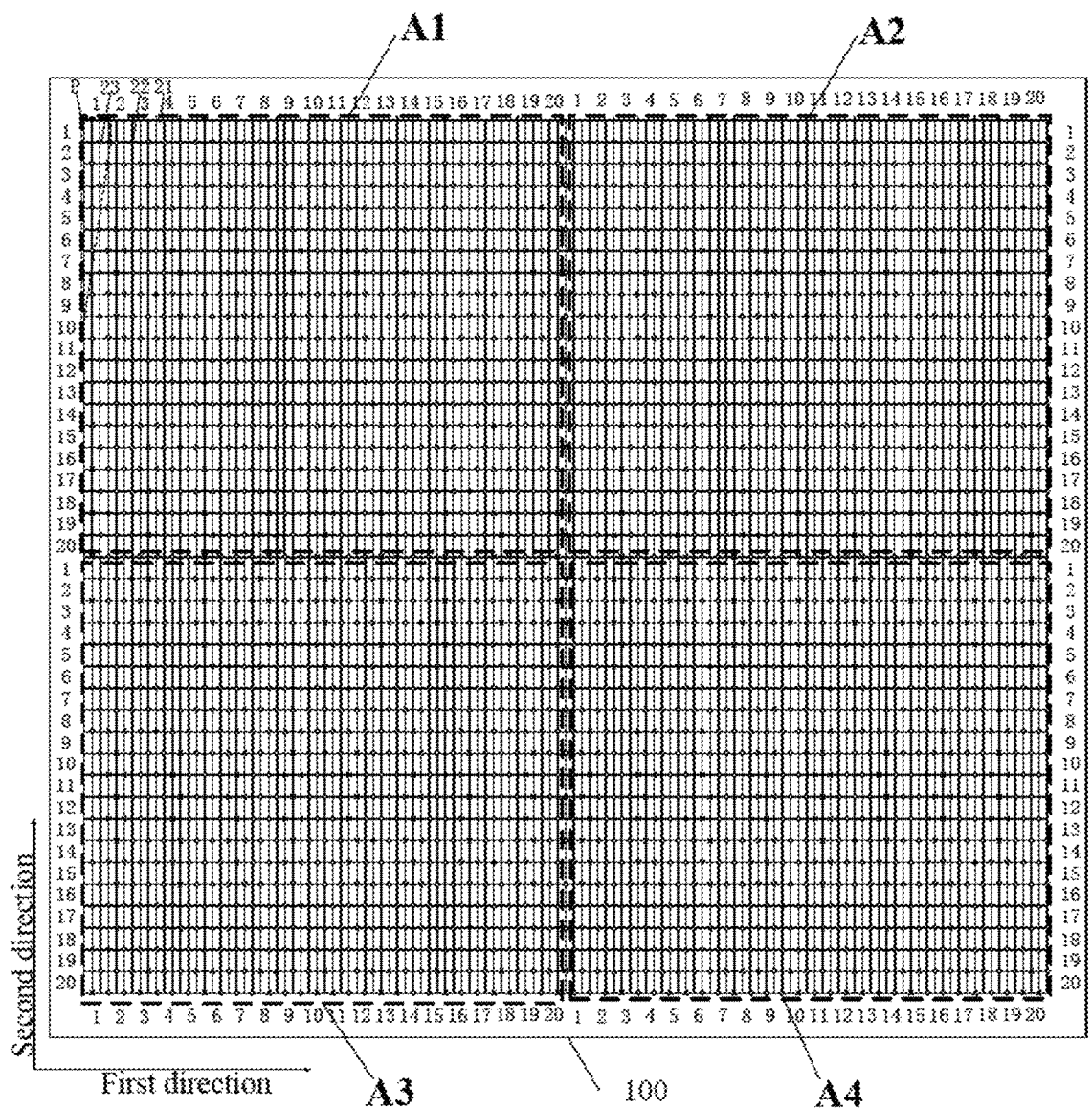
FIG. 5 is a schematic diagram illustrating the structure of a display substrate having a plurality of repeating groups of pixel areas in some embodiments according to the present disclosure.

FIG. 5 is a schematic diagram illustrating the structure of a display substrate having a plurality of repeating groups of pixel areas in some embodiments according to the present disclosure. Referring to FIG. 5, the display substrate includes four repeating groups (A1, A2, A3, and A4) of pixel areas P, each of which includes the plurality of pixel areas P depicted in FIG. 1. In FIG. 5, the four repeating groups of pixel areas P are translationally repeated along the row direction (the first direction) and the column direction (the second direction). As used herein, the term "repeating" is not limited to translationally repeating. In one example, one of the plurality of repeating groups of pixel areas is repeated by rotation of one or more of the plurality of repeating groups of pixel areas. In another example, one of the plurality of repeating groups of pixel areas is repeated by translation of one or more of the plurality of repeating groups of pixel areas. In another example, in the display substrate, some of the plurality of repeating groups of pixel areas are repeated by rotation of one or more of the plurality of repeating groups of pixel areas, and some of the plurality of repeating groups of pixel areas are repeated by translation of one or more of the plurality of repeating groups of pixel areas.

FIG. 1 depicts one of the plurality of repeating groups of pixel areas P. Referring to FIG. 1, in each of the plurality of repeating groups of pixel areas P, the one of the plurality of main spacers 22 corresponding to the first row of pixel areas P corresponds to the second column of pixel areas P; the one of the plurality of main spacers 22 corresponding to the second row of pixel areas P corresponds to the seventh column of pixel areas P; the one of the plurality of main spacers 22 corresponding to the third row of pixel areas P corresponds to the fourteenth column of pixel areas P; the one of the plurality of main spacers 22 corresponding to the fourth row of pixel areas P corresponds to the nineteenth column of pixel areas P; the one of the plurality of main spacers 22 corresponding to the fifth row of pixel areas P corresponds to the sixth column of pixel areas P; the one of the plurality of main spacers 22 corresponding to the sixth row of pixel areas P corresponds to the eleventh column of pixel areas P; the one of the plurality of main spacers 22 corresponding to the seventh row of pixel areas P corresponds to the eighteenth column of pixel areas P; the one of the plurality of main spacers 22 corresponding to the eighth row of pixel areas P corresponds to the third column of pixel areas P; the one of the plurality of main spacers 22 corresponding to the ninth row of pixel areas P corresponds to the tenth column of pixel areas P; the one of the plurality of main spacers 22 corresponding to the tenth row of pixel areas P corresponds to the fifteenth column of pixel areas P; the one of the plurality of main spacers 22 corresponding to the eleventh row of pixel areas P corresponds to the twentieth column of pixel areas P; the one of the plurality of main spacers 22 corresponding to the twelfth row of pixel areas P corresponds to the fifth column of pixel areas P; the one of the plurality of main spacers 22 corresponding to the thirteenth row of pixel areas P corresponds to the twelfth column of pixel areas P; the one of the plurality of main spacers 22 corresponding to the fourteenth row of pixel areas P corresponds to the seventeenth column of pixel areas P; the one of the plurality of main spacers 22 corresponding to the fifteenth row of pixel areas P corresponds to the fourth column of pixel areas P; the one of the plurality of main spacers 22 corresponding to the sixteenth row of pixel areas P corresponds to the ninth column of pixel areas P; the one of the plurality of main spacers 22 corresponding to the seventeenth row of pixel areas P corresponds to the sixteenth column of pixel areas P; the one of the plurality of main spacers 22 corresponding to the eighteenth row of pixel areas P corresponds to the first column of pixel areas P; the one of the plurality of main spacers 22 corresponding to the nineteenth row of pixel areas P corresponds to the eighth column of pixel areas P; and the one of the plurality of main spacers 22 corresponding to the twentieth row of pixel areas P corresponds to the thirteenth column of pixel areas P.

In some embodiments, a total number of main spacers 22 in M consecutive rows of pixel areas P is N. A total number of main spacers 22 in M consecutive rows of pixel areas P, and corresponding to odd-numbered columns of pixel areas P, is N1. A total number of main spacers 22 in M consecutive rows of pixel areas P, and corresponding to even-numbered columns of pixel areas P, is N2. N=N1+N2. Optionally, each of N and N2 is a positive integer equal to or less than five. Optionally, M is a positive integer equal to or less than five.

In one example, a total number of main spacers 22 in five consecutive rows of pixel areas P, and corresponding to odd-numbered columns of pixel areas P, is a positive integer less than five; and a total number of main spacers 22 in five consecutive rows of pixel areas P, and corresponding to even-numbered columns of pixel areas P, is a positive integer less than five. Referring to FIG. 1, a total number of main spacers 22 in the first to fifth rows of pixel areas P. and corresponding to odd-numbered columns of pixel areas P, is two; and a total number of main spacers 22 in the first to fifth rows of pixel areas P, and corresponding to even-numbered columns of pixel areas P, is three.

The present display substrate may be used for displaying any types of images. Optionally, the display substrate is used for displaying an image having a flicker pattern. Optionally, the flicker pattern includes a black-gray flicker pattern. Optionally, the flicker pattern includes a purple-green flicker pattern. Optionally, the flicker pattern includes a red-black flicker pattern. Optionally, the flicker pattern includes a red-gray flicker pattern. Optionally, the flicker pattern includes a blue-black flicker pattern. Optionally, the flicker pattern includes a blue-gray flicker pattern. Optionally, the flicker pattern includes a green-gray flicker pattern.

In some embodiments of the present display substrate, a total number of main spacers 22 in five consecutive rows of pixel areas P, and corresponding to odd-numbered columns of pixel areas P, is a positive integer less than five; and a total number of main spacers 22 in five consecutive rows of pixel areas P, and corresponding to even-numbered columns of pixel areas P, is a positive integer less than five. As a result, the white mura can be avoided when displaying an image having a black-gray flicker pattern, particularly when the display panel having the present display substrate is driven in a column inversion mode, greatly enhancing the sharpness of the image displayed in the flicker pattern and improving display quality. Similarly, the distribution of the plurality of main spacers 22 can designed so that the mura in other flicker patterns (e.g., the purple-green flicker pattern, the red-gray flicker pattern, the blue-gray flicker pattern, and the green-gray flicker pattern) can be effectively avoided.

Figure 6:
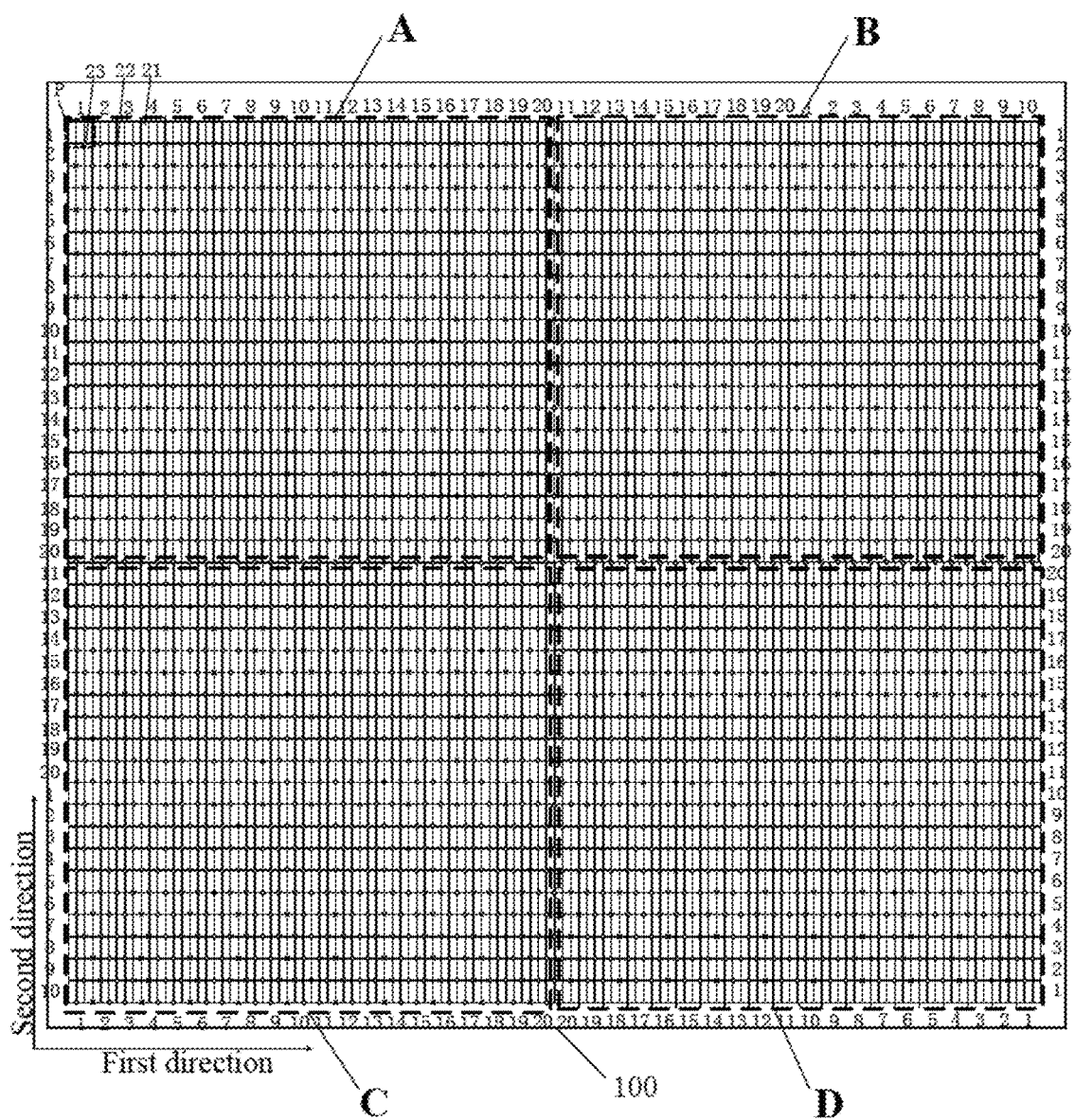
FIG. 6 is a schematic diagram illustrating the structure of a display substrate having a plurality of groups of pixel areas in some embodiments according to the present disclosure.

In some embodiments, the display substrate includes at least one group of pixel areas, each of which is a group of pixel areas P described above (e.g., depicted in FIG. 1). For example, each of the at least one group of pixel areas includes a matrix of pixel areas, and, in each of the at least one group of pixel areas, each row of the plurality of pixel areas corresponds to at least one of the plurality of main spacers, and each column of the plurality of pixel areas corresponds to at least one of the plurality of main spacers. The at least one group of pixel areas do not necessarily have to be repeating. FIG. 6 is a schematic diagram illustrating the structure of a display substrate having a plurality of groups of pixel areas in some embodiments according to the present disclosure. Referring to FIG. 6, the display substrate includes four groups (A, B, C, and D) of pixel areas P, each of which includes a matrix of pixel areas, and, in each of the at least one group of pixel areas, each row of the plurality of pixel areas corresponds to at least one of the plurality of main spacers, and each column of the plurality of pixel areas corresponds to at least one of the plurality of main spacers. The four groups (A, B, C, and D) of pixel areas P are not repeating. As long as each of the four groups of pixel areas P satisfies the characteristics of the matrix of pixel areas described herein, the white mura in a flicker pattern in a display panel having the present display substrate can be avoided, enhancing the sharpness of the image displayed in the flicker pattern and improving display quality.

In some embodiments, the display substrate further includes a color filter. Optionally, the display substrate is an array substrate and includes the color filter. Optionally, the display substrate is a color filter substrate facing an array substrate in a display panel having the display substrate.

In another aspect, the present disclosure provides a method of fabricating a display substrate having an array of a plurality of pixel areas P. In some embodiments, the method includes forming a plurality of main spacers on a base substrate. The array of the plurality of pixel areas P are arranged in a matrix in rows and columns. Optionally, the plurality of main spacers are formed so that each row of the plurality of pixel areas along the first direction corresponds to at least one of the plurality of main spacers, and each column of the plurality of pixel areas along the second direction corresponds to at least one of the plurality of main spacers. By having this design, white mura in a flicker pattern in a display panel having the present display substrate can be avoided, enhancing the sharpness of the image displayed in the flicker pattern and improving display quality.

In some embodiments, the plurality of main spacers are formed so that each row of the plurality of pixel areas corresponds to a single one of the plurality of main spacers, e.g., the total area occupied by the plurality of main spacers in each row of the plurality of pixel areas is substantially equal to a single one of the plurality of main spacers. Optionally, the plurality of main spacers are formed so that a single one of the plurality of main spacers is disposed on each row of the plurality of pixel areas.

In some embodiments, the plurality of main spacers are formed so that a first one of the plurality of main spacers corresponds to a first row of the plurality of pixel areas and a first column of the plurality of pixel areas, a second one of the plurality of main spacers corresponds to a second row of the plurality of pixel areas and a second column of the plurality of pixel areas. The first row and the second row are different rows of the plurality of pixel areas, and the first column and the second column are different columns of the plurality of pixel areas.

Optionally, the plurality of main spacers are formed so that each of the plurality of main spacers corresponding to an odd-numbered row of the plurality of pixel areas corresponds to an even-numbered column of the plurality of pixel areas. Optionally, the plurality of main spacers are formed so that each of the plurality of main spacers corresponding to an even-numbered row of the plurality of pixel areas P corresponds to an odd-numbered column of the plurality of pixel areas. Referring to FIG. 1, the plurality of main spacers are formed so that the one of the plurality of main spacers corresponding to the first row of the plurality of pixel areas corresponds to the second column of the plurality of pixel areas, and the one of the plurality of main spacers corresponding to the second row of the plurality of pixel areas corresponds to the seventh column of the plurality of pixel areas.

In some embodiments, the plurality of main spacers are formed so that each of the plurality of main spacers corresponding to an odd-numbered row of the plurality of pixel areas corresponds to an even-numbered column of the plurality of pixel areas, and each of the plurality of main spacers corresponding to an even-numbered row of the plurality of pixel areas corresponds to an odd-numbered column of the plurality of pixel areas. By having this design, white mura in a flicker pattern in a display panel having the present display substrate can be avoided, enhancing the sharpness of the image displayed in the flicker pattern and improving display quality.

In some embodiments, the plurality of main spacers are formed to have a distribution density of the plurality of main spacers 22 in the display substrate is in a range of 1:144 to 1:3, e.g., 1:120 to 1:20, 1:100 to 1:40, 1:80 to 1:60. Optionally, the plurality of main spacers are formed to have a distribution density of approximately 1:60. Optionally, the plurality of main spacers are formed to have a distribution density of approximately 1:80.

In some embodiments, the plurality of main spacers are formed so that an orthographic projection of the one of the plurality of main spacers corresponding to each row of plurality of pixel areas on the base substrate partially overlaps with an orthographic projection of each of multiple adjacent subpixel areas of the plurality of subpixel areas on the base substrate. Aperture ratios of the multiple adjacent subpixel areas of the plurality of subpixel areas differ from each other by equal to or less than 1%. This design ensures that the display substrate has a substantially uniform aperture ratio of subpixel areas.

In some embodiments, the plurality of main spacers are formed so that the orthographic projection of the one of the plurality of main spacers corresponding to each row of plurality of pixel areas on the base substrate partially overlaps with an orthographic projection of each of four adjacent subpixel areas of the plurality of subpixel areas on the base substrate. The four adjacent subpixel areas 21 of the plurality of subpixel areas 21 include two adjacent subpixel areas 21 in the present row, and two adjacent subpixel areas 21 in an adjacent row (e.g., a previous adjacent row or a next adjacent row) that are adjacent to the two adjacent subpixel areas 21 in the present row.

In some embodiments, the plurality of main spacers are formed so that a total number of main spacers in M consecutive rows of pixel areas is N. A total number of main spacers in M consecutive rows of pixel areas, and corresponding to odd-numbered columns of pixel areas, is N1. A total number of main spacers in M consecutive rows of pixel areas, and corresponding to even-numbered columns of pixel areas, is N2. N=N1+N2. Optionally, the plurality of main spacers are formed so that each of N1 and N2 is a positive integer equal to or less than five. Optionally, M is a positive integer equal to or less than five.

In some embodiments, the method further includes forming a plurality of auxiliary spacers. Optionally, the plurality of auxiliary spacers are formed so that each row of the plurality of pixel areas corresponds to multiple of plurality of auxiliary spacers. Optionally, the plurality of auxiliary spacers are formed so that each column of the plurality of pixel areas corresponds to multiple of plurality of auxiliary spacers. Optionally, the plurality of spacers (main spacer(s) or auxiliary spacers) are formed to be substantially equally spaced apart, e.g., in each row or in each column. In one example, in each row or in each column, the plurality of main spacers and the plurality of auxiliary spacers are formed so that a distance between each pair of adjacent main spacer and auxiliary spacer is substantially the same as a distance between each pair of adjacent auxiliary spacers.

In some embodiments, the plurality of auxiliary spacers are formed so that an orthographic projection of any one of the plurality of auxiliary spacers on the base substrate partially overlaps with an orthographic projection of each of four adjacent subpixel areas of the plurality of subpixel areas on the base substrate. The four adjacent subpixel areas of the plurality of subpixel areas include two adjacent subpixel areas in the present row, and two adjacent subpixel areas in an adjacent row (e.g., a previous adjacent row or a next adjacent row) that are adjacent to the two adjacent subpixel areas in the present row.

In another aspect, the present disclosure provides a display panel having the present display substrate.

Optionally, the display substrate is a counter substrate, e.g., a color filter substrate. Optionally, the display panel further includes an array substrate facing the display substrate (e.g., a color filter substrate).

Optionally, the display substrate is an array substrate. Optionally, the display panel further includes a counter substrate (e.g., a color filter substrate) facing the display substrate.

In some embodiments, the plurality of main spacers are disposed between the display substrate and the second display substrate facing the display substrate, maintaining a substantially uniform cell gap between the display substrate and the counter substrate. Optionally, each of the plurality of main spacers is a spacer that dissipate more stress than each of the plurality of auxiliary spacers.

In some embodiments, the display panel further includes a liquid crystal layer between the display substrate and the second display substrate.

In another aspect, the present disclosure provides a display apparatus having the display substrate described herein or fabricated by a method described herein. Examples of appropriate display apparatuses include, but are not limited to, a liquid crystal display panel, an electronic paper, an organic light emitting display panel, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate having an array of a plurality of pixel areas, comprising:
    a base substrate; and
    a plurality of main spacers on the base substrate;
    wherein the array of the plurality of pixel areas comprises at least one group of pixel areas, each of the at least one group of pixel areas comprises a matrix of pixel areas;
    wherein, in each of the at least one group of pixel areas, each row of the plurality of pixel areas corresponds to a respective single one of the plurality of main spacers, each column of the plurality of pixel areas corresponds to a respective single one of the plurality of main spacers, and two of the plurality of main spacers corresponding to different rows of the plurality of pixel areas correspond to different columns of the plurality of pixel areas; and
    wherein, in each of the at least one group of pixel areas, each of the plurality of main spacers corresponding to an odd-numbered row of the plurality of pixel areas corresponds to an even-numbered column of the plurality of pixel areas, and each of the plurality of main spacers corresponding to an even-numbered row of the plurality of pixel areas corresponds to an odd-numbered column of the plurality of pixel areas;
    wherein, in each of the at least one group of pixel areas, two main spacers respectively corresponding to any two immediately adjacent columns of the plurality of pixel areas respectively correspond to a m-th row and a n-th row of the plurality of pixel areas, the m-th row and the n-th row being spaced apart by at least one row of the plurality of pixel areas.

2. The display substrate of claim 1, wherein, in each of the at least one group of pixel areas,
    each of the plurality of pixel areas comprises a plurality of subpixel areas; and
    a ratio of a total number of the plurality of main spacers to a total number of the plurality of subpixel areas is in a range of 1:144 to 1:3.

3. The display substrate of claim 2, wherein the ratio of the total number of the plurality of main spacers to the total number of the plurality of subpixel areas is in a range of 1:80 to 1:60.

4. The display substrate of claim 1, wherein, in each of the at least one group of pixel areas,
    each of the plurality of pixel areas comprises a plurality of subpixel areas;
    an orthographic projection of the one of the plurality of main spacers corresponding to each row of plurality of pixel areas on the base substrate partially overlaps with an orthographic projection of each of multiple adjacent subpixel areas of the plurality of subpixel areas on the base substrate; and
    aperture ratios of the multiple adjacent subpixel areas of the plurality of subpixel areas differ from each other by equal to or less than 1%.

5. The display substrate of claim 4, wherein the orthographic projection of the one of the plurality of main spacers corresponding to each row of plurality of pixel areas on the base substrate partially overlaps with an orthographic projection of each of four adjacent subpixel areas of the plurality of subpixel areas on the base substrate;
    the four adjacent subpixel areas of the plurality of subpixel areas comprise two adjacent subpixel areas in a present row, and two adjacent subpixel areas in an adjacent row; and
    the two adjacent subpixel areas in the adjacent row are respectively adjacent to the two adjacent subpixel areas in the present row.

6. The display substrate of claim 1, wherein, in each of the at least one group of pixel areas,
    a total number N of main spacers in five consecutive rows of pixel areas is less than ten.

7. The display substrate of claim 6, wherein, in each of the at least one group of pixel areas,
    a total number N1 of main spacers corresponding to odd-numbered columns of pixel areas in five consecutive rows of pixel areas is a positive integer less than five; and
    a total number N2 of main spacers corresponding to even-numbered columns of pixel areas in five consecutive rows of pixel areas is a positive integer less than five.

8. The display substrate of claim 7; wherein a sum of N1 and N2 is five, each of N1 and N2 is equal to or greater than 2.

9. The display substrate of claim 1, further comprising a plurality of auxiliary spacers;
   wherein each row of the plurality of pixel areas corresponds to multiple of plurality of auxiliary spacers; and
   each column of the plurality of pixel areas corresponds to multiple of plurality of auxiliary spacers.

10. The display substrate of claim 9, wherein each of the plurality of pixel areas comprises a plurality of subpixel areas; and
   an orthographic projection of any one of the plurality of auxiliary spacers on the base substrate partially overlaps with an orthographic projection of each of multiple adjacent subpixel areas of the plurality of subpixel areas on the base substrate.

11. The display substrate of claim 1, wherein one of the at least one group of pixel areas comprises a matrix of pixel areas having at least twenty pixel areas along a row direction and at least twenty pixel areas along a column direction.

12. The display substrate of claim 1, wherein the at least one group of pixel areas comprises a plurality of repeating groups of pixel areas.

13. The display substrate of claim 1, wherein the at least one group of pixel areas consists of a single group of pixel areas.

14. A display apparatus, comprising a display substrate of claim 1 and a second display substrate facing the display substrate;
   wherein the plurality of main spacers maintain a cell gap between the display substrate and the second display substrate.

15. A method of fabricating a display substrate having an array of a plurality of pixel areas, comprising forming a plurality of main spacers on a base substrate;

wherein the array of the plurality of pixel areas is formed to comprise at least one group of pixel areas, each of the at least one group of pixel areas is formed to comprise a plurality of pixel areas arranged in a matrix;

wherein, in each of the at least one group of pixel areas, the plurality of main spacers are formed so that each row of the plurality of pixel areas corresponds to a respective single one of the plurality of main spacers, each column of the plurality of pixel areas corresponds to a respective single one of the plurality of main spacers, and two of the plurality of main spacers corresponding to different rows of the plurality of pixel areas correspond to different columns of the plurality of pixel areas;

wherein each of the plurality of main spacers corresponding to an odd-numbered row of the plurality of pixel areas corresponds to an even-numbered column of the plurality of pixel areas; and each of the plurality of main spacers corresponding to an even-numbered row of the plurality of pixel areas corresponds to an odd-numbered column of the plurality of pixel areas;

wherein, in each of the at least one group of pixel areas, two main spacers respectively corresponding to any two immediately adjacent columns of the plurality of pixel areas respectively correspond to a m-th row and a n-th row of the plurality of pixel areas, the m-th row and the n-th row being spaced apart by at least one row of the plurality of pixel areas.

* * * * *